United States Patent
Mizoguchi et al.

(10) Patent No.: US 10,205,315 B2
(45) Date of Patent: Feb. 12, 2019

(54) FAULT DETECTION SYSTEM

(71) Applicant: DENSO CORPORATION, Kariya, Aichi-pref. (JP)

(72) Inventors: Hayato Mizoguchi, Kariya (JP); Takashi Inamoto, Kariya (JP)

(73) Assignee: DENSO CORPORATION, Kariya (JP)

( * ) Notice: Subject to any disclaimer, the term of this patent is extended or adjusted under 35 U.S.C. 154(b) by 142 days.

(21) Appl. No.: 15/206,419

(22) Filed: Jul. 11, 2016

(65) Prior Publication Data

US 2017/0012422 A1 Jan. 12, 2017

(30) Foreign Application Priority Data

Jul. 9, 2015 (JP) .................................. 2015-137812

(51) Int. Cl.
| | |
|---|---|
| *H02H 3/16* | (2006.01) |
| *H02H 1/06* | (2006.01) |
| *H02H 11/00* | (2006.01) |
| *B60L 3/00* | (2006.01) |

(52) U.S. Cl.
CPC .......... *H02H 11/005* (2013.01); *B60L 3/0069* (2013.01)

(58) Field of Classification Search
CPC .......... H02H 11/005; H02H 3/16; H02H 1/06; B60L 3/00
USPC .......................................................... 361/62
See application file for complete search history.

(56) References Cited

U.S. PATENT DOCUMENTS

| | | | |
|---|---|---|---|
| 2009/0108674 A1* | 4/2009 | Ozaki | B60L 3/0046 307/10.6 |
| 2015/0060423 A1 | 3/2015 | Tanaka et al. | |
| 2016/0252584 A1* | 9/2016 | Iwanaga | G01R 31/3658 324/434 |

FOREIGN PATENT DOCUMENTS

| | | |
|---|---|---|
| JP | 3781289 B2 | 5/2006 |
| JP | 2013068479 A * | 4/2013 |

OTHER PUBLICATIONS

Machine Translation of Fujii et al. Japanese Patent Document JP 2013-068479 A, dated Apr. 2013.*

* cited by examiner

*Primary Examiner* — Thienvu Tran
*Assistant Examiner* — Kevin J Comber
(74) *Attorney, Agent, or Firm* — Oliff PLC

(57) ABSTRACT

A fault detection system is provided which includes power lines connecting between a DC power supply and electric equipment, switches respectively provided to the power lines, a capacitor connected to the power lines at a position where a distance to the electric equipment is shorter than a distance between the switches and the electric equipment, a charging unit charging the capacitor before the switches are turned on, a detection section connected to the power line at a connecting point where a distance to the DC power supply is shorter than a distance between the switches and the DC power supply, and detecting a change in an electric potential of the connecting point, and a determination section determining whether a short-circuit fault has occurred in any one of the switches based on a difference in the electric potential of the connecting point between before and after the capacitor is charged.

5 Claims, 14 Drawing Sheets

FAULT DETECTION SYSTEM

CROSS-REFERENCE TO RELATED APPLICATION

This application is based on and claims the benefit of priority from earlier Japanese Patent Application No. 2015-137812 filed Jul. 9, 2015, the description of which is incorporated herein by reference.

BACKGROUND (Technical Field)

The present invention relates to a fault detection system that includes switches respectively provided to a pair of electric power lines connecting a DC power supply and electric equipment, and a determination section that determines whether or not a short-circuit fault has occurred in the switches.

(Related Art)

A fault detection system is known that includes a pair of electric power lines connecting between a DC power supply and electric equipment, relays provided to the electric power lines, a capacitor connected to the electric equipment in parallel, and a determination section that determines whether or not a short-circuit fault has occurred in switches in the relays (refer to Japanese Patent No. 3781289).

If the switch is stuck by melting, or a spring member in the relay or a drive circuit is failed, the switch may remain turned on even when the switch is controlled so as to be turned off. The determination section determines whether or not such a fault (short-circuit fault) has occurred.

The switches are respectively provided to the pair of electric power lines. When it is determined whether or not a short-circuit fault has occurred in the switches, only one of the pair of switches is controlled so as to be turned on. At this time, if a short-circuit fault has occurred in the other of the pair of switches, a current flows to the capacitor, whereby the voltage increases. Hence, determining whether or not the voltage has increased can determine whether or not a short-circuit fault has occurred in the other of the pair of switches. If it is determined that a short-circuit fault has not occurred, only the other of the pair of switches is controlled so as to be turned on. At this time, if a short-circuit fault has occurred in one of the pair of switches, a current flows to the capacitor, whereby the voltage increases. Hence, determining whether or not the voltage has increased can determine whether or not a short-circuit fault has occurred in the switch.

As described above, to check for occurrence of a short-circuit fault, the relays are required to be formed so that the pair of switches can be separately operated. That is, it is required to configure the fault detection system by providing two magnet coils in the relays so that the individual switches can be turned on and off by the individual magnet coils. Hence, the manufacturing cost of the relays increases.

Recently, it is considered that one magnet coil should be provided in the relay to turn on and off both of the pair of switches by the magnet coil, to decrease the manufacturing cost of the relay.

However, if one magnet coil is provided in the relay, the pair of switches cannot be separately operated. Hence, it cannot be determined whether or not a short-circuit fault has occurred in the switches.

SUMMARY

An embodiment provides a fault detection system that can check for occurrence of a short-circuit fault of a pair of switches even when the switches cannot individually operate.

As an aspect of the embodiment, a fault detection system is provided which includes: a pair of electric power lines that connects between a DC power supply and electric equipment; a pair of switches that is respectively provided to the pair of electric power lines; a capacitor that is connected to the pair of electric power lines at a position where a distance to the electric equipment is shorter than a distance between the switches and the electric equipment; a charging unit that charges the capacitor before the switches are turned on; a detection section that is connected to the electric power line at a connecting point where a distance to the DC power supply is shorter than a distance between the switches and the DC power supply, and detects a change in an electric potential of the connecting point; and a determination section that determines whether or not a short-circuit fault has occurred in any one of the pair of switches based on a difference in the electric potential of the connecting point between before and after the capacitor is charged by the charging unit.

DETAILED DESCRIPTION OF THE PREFERRED EMBODIMENTS

With reference to the accompanying drawings, hereinafter are described embodiments according to the present invention.

In the following embodiments, a fault detection system may be an in-vehicle fault detection system mounted in a vehicle such as an electric car and a hybrid car. Electric equipment may be a power converter that converts DC power, which is supplied from a DC power supply, to AC power.

First Embodiment

Figure 1:
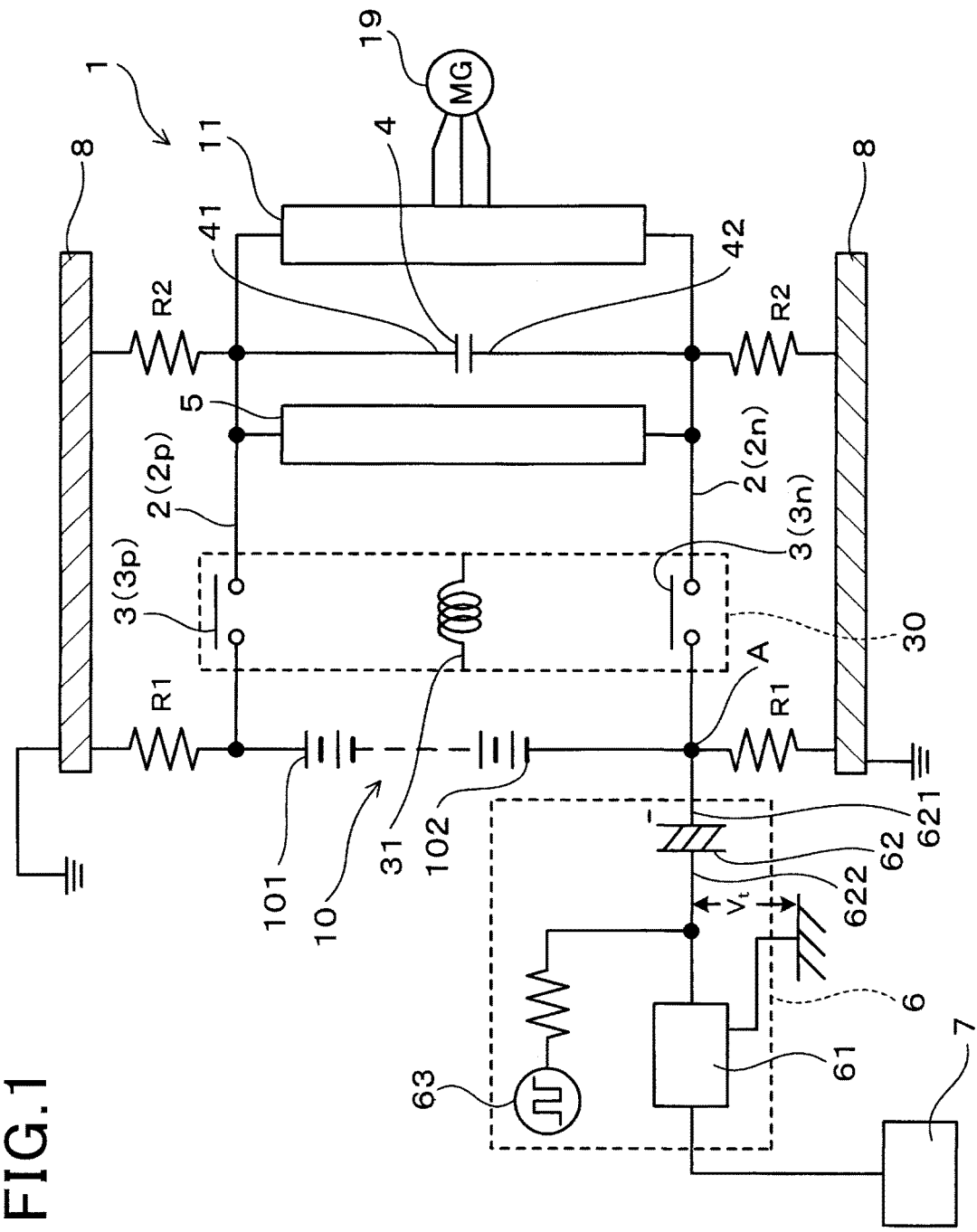
FIG. 1 is a circuit diagram of a fault detection system according to a first embodiment.

A fault detection system according to the first embodiment will be described with reference to FIGS. 1 to 17. As shown in FIG. 1, the fault detection system 1 includes a pair of electric power lines 2 (2p, 2n), a pair of switches 3 (3p, 3n), a capacitor 4, a charging unit 5, a detection section 6, and a determination section 7.

The electric power lines 2 connect between a DC power supply 10 and electric equipment 11. The switches 3 are respectively provided to the pair of electric power lines 2p, 2n. The capacitor 4 is connected to the pair of electric power lines 2p, 2n at a position where the distance from the capacitor 4 to the electric equipment 11 is shorter than the distance between the switches 3 and the electric equipment 11.

In addition, the charging unit 5 is provided to charge the capacitor 4 before the switches 3 are turned on. The detection section 6 is connected to the electric power line 2 at a connecting point A where the distance to the DC power supply 10 is shorter than the distance between the switches 3 and the DC power supply 10. The detection section 6 detects a change in the electric potential of the connecting point A. The determination section 7 determines whether or not a short-circuit fault has occurred in any one of the pair of switches 3p and 3n, based on a difference (change) in the electric potential of the connecting point A between before and after the capacitor 4 is charged by the charging unit 5.

The fault detection system 1 is an in-vehicle fault detection system to be mounted in a vehicle such as an electric car and a hybrid car. In addition, the electric equipment 11 is a power converter that converts DC power, which is supplied from the DC power supply 10, to AC power. A three-phase AC motor 19 is connected to the power converter (electric equipment 11). The vehicle is driven by using the three-phase AC motor 19.

The electric power lines 2 include a positive side electric power line 2p connecting a positive electrode 101 of the DC power supply 10 and the electric equipment 11, and a negative side electric power line 2n connecting a negative electrode 102 of the DC power supply 10 and the electric equipment 11. In addition, the switches 3 include a positive side switch 3p provided to the positive side electric power line 2p, and a negative side switch 3n provided to the negative side electric power line 2n. The switched 3p and 3n are arranged in a relay 30. In addition, the relay 30 is provided with a magnet coil 31. When a current is applied to the magnet coil 31, the two switched 3p and 3n are simultaneously turned on.

The vehicle is provided with a grounded conductive member 8. The conductive member 8 is, for example, the body of the vehicle. The DC power supply 10, the electric power lines 2, the switches 3, the capacitor 4, the electric equipment 11, and the charging unit 5 are insulated from the conductive member 8.

Figure 17:
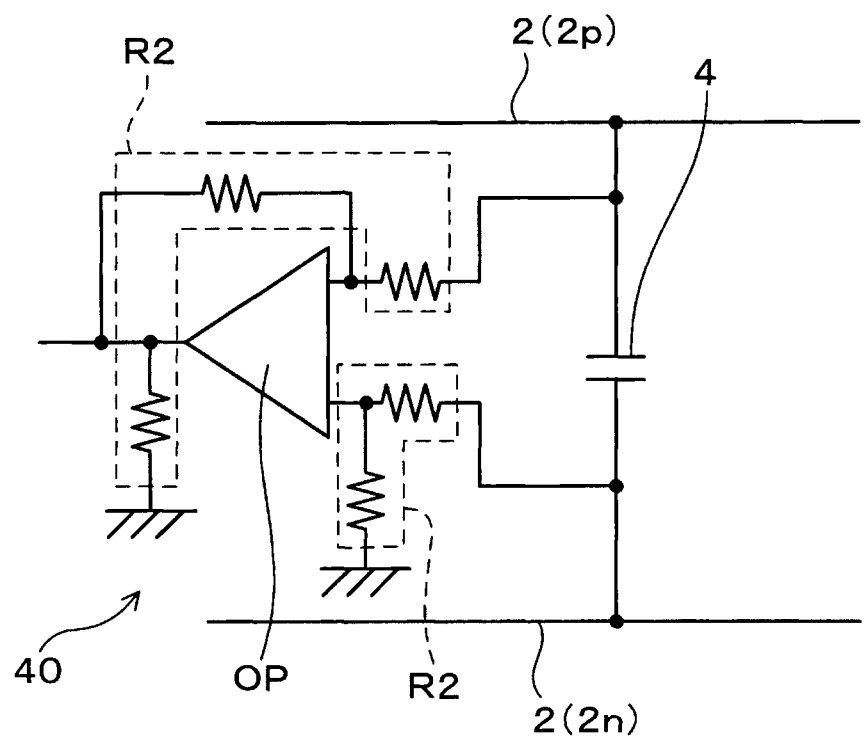
FIG. 17 is a circuit diagram of a capacitor voltage measurement section according to the first embodiment.

First resistors R1, which are air, insulators, or the like, are provided between the DC power supply 10 and the conductive member 8. The resistance value of the first resistor R1 is, for example, several hundreds of megohms (MΩ). In addition, second resistors R2 are provided between the capacitor 4 and the conductive member 8. The resistance value of the second resistor R2 is, for example, several megohms (MΩ). The second resistors R2 are used for a measurement circuit 40 (refer to FIG. 17) that measures the voltage of the capacitor 4. As shown in FIG. 17, the measurement circuit 40 includes an operational amplifier OP and a plurality resistors connected to the operational amplifier OP. The resistors form the second resistors R2.

In addition, as shown in FIG. 1, the charging unit 5 is connected to the capacitor 4 in parallel. The charging unit 5 is configured by a bidirectional DC/DC converter. The charging unit 5 is connected to a low voltage battery, not shown. Before the switches 3 are turned on, the charging unit 5 steps up the voltage of the low voltage battery to charge the capacitor 4. In addition, after the switches 3 are turned on, the charging unit 5 (bidirectional DC/DC converter) steps down the voltage of the DC power supply 10 to charge the low voltage battery and send electric power to other equipment.

The detection section 6 includes a detection main unit 61, a detection capacitor 62, and a signal generation unit 63. The detection capacitor 62 is provided between the detection main unit 61 and the connecting point A. The detection main unit 61 has a filter circuit for eliminating noise and a voltage measurement circuit. The detection capacitor 62 has two terminals 621 and 622. The detection main unit 61 is used to measure a terminal voltage Vt, which is a potential difference between the ground and the terminal 622 positioned at the opposite side of the terminal 621 connected to the connecting point A.

Figure 10:
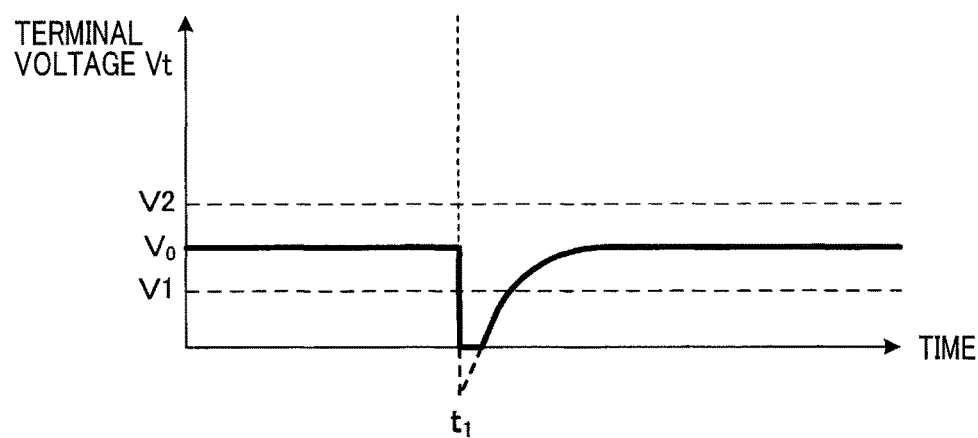
FIG. 10 is a graph showing a change in the terminal voltage in a case where a short-circuit fault has occurred in the positive-side switch, according to the first embodiment.
Figure 11:
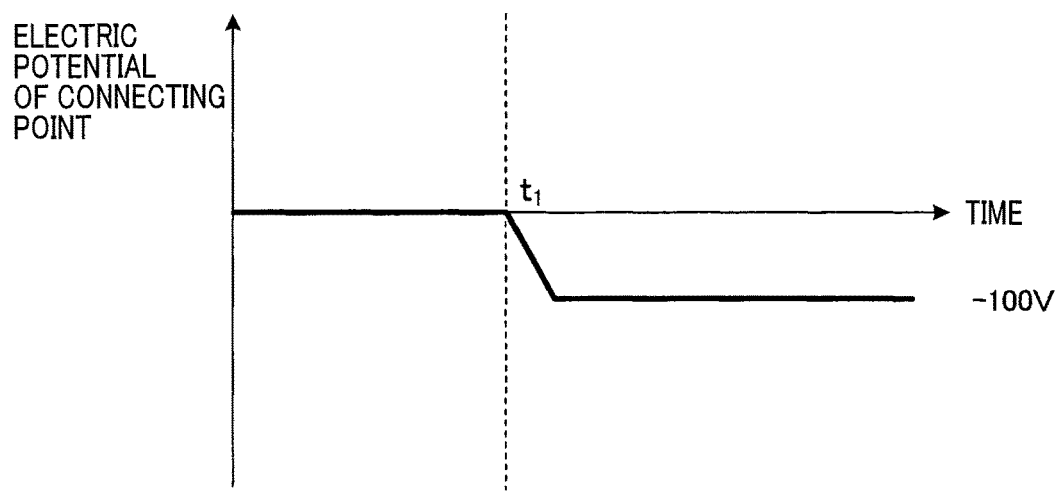
FIG. 11 is a graph showing a change in the electric potential of the connecting point in a case where a short-circuit fault has occurred in the negative-side switch, according to the first embodiment.

When occurrence of a short-circuit fault in the switches 3 is checked, the signal generation unit 63 generates a DC voltage to set the terminal voltage Vt to a constant value Vo. At this time, when the electric potential of the connecting point A rapidly increases, a current flows to the detection capacitor 62, which stores electric charge. Hence, the electric potential of the terminal 622 relatively decreases with respect to that of the connecting point A. Thereby, as shown in FIG. 10, the terminal voltage Vt decreases. Thereafter, by the function of the signal generation unit 63 of making the terminal voltage Vt constant, the terminal voltage Vt returns to the original value Vo. Note that since the detection main unit 61 cannot measure a negative voltage, as shown in FIG. 10, only positive values of the terminal voltage Vt are measured.

Figure 12:
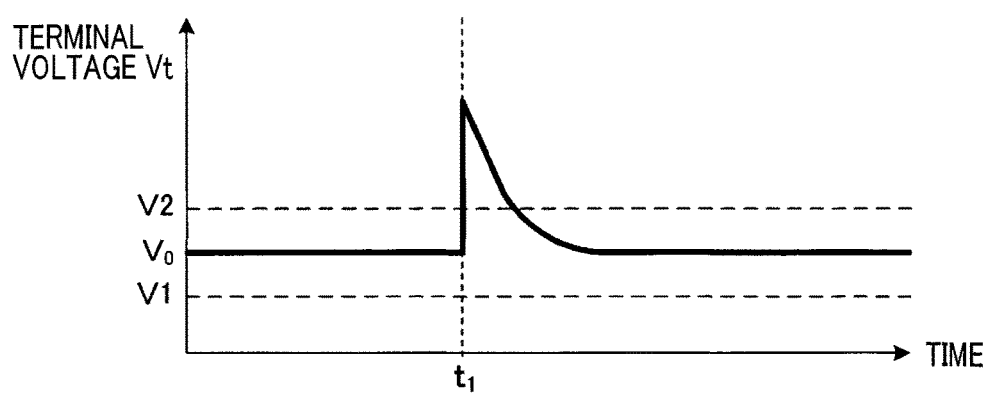
FIG. 12 is a graph showing a change in the terminal voltage in a case where a short-circuit fault has occurred in the negative-side switch, according to the first embodiment.

In addition, if the electric potential of the connecting point A rapidly decreases, the detection capacitor 62 releases charge. Hence, the electric potential of the terminal 622 increases relative to that of the connecting point A. Thereby, as shown in FIG. 12, the terminal voltage Vt increases.

Figure 2:
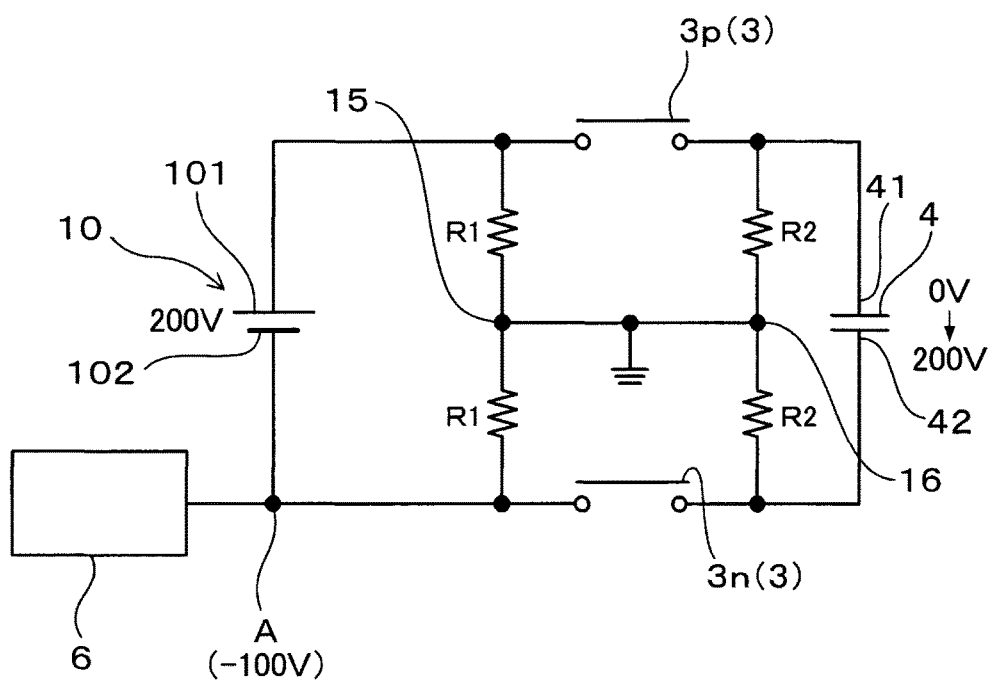
FIG. 2 is an equivalent circuit schematic of the fault detection system in which a short-circuit fault has not occurred in any of a pair of switches, according to the first embodiment.

Next, the reason is described why the electric potential of the connecting point A differs between before and after the capacitor 4 is charged. FIG. 2 is an equivalent circuit schematic of a main part of the fault detection system 1. As shown in FIG. 2, the DC power supply 10 is connected with the two first resistors R1. The connecting point 15 of the two first resistors R1 is grounded. In addition, the capacitor 4 is connected with the two second resistors R2. The connecting point 16 of the two second resistors R2 is grounded. The positive side switch 3p is provided between the positive electrode 101 of the DC power supply 10 and a positive electrode terminal 41 of the capacitor 4. In addition, the negative side switch 3n is provided between the negative electrode 102 of the DC power supply 10 and a negative electrode terminal 42 of the capacitor 4.

Figure 7:
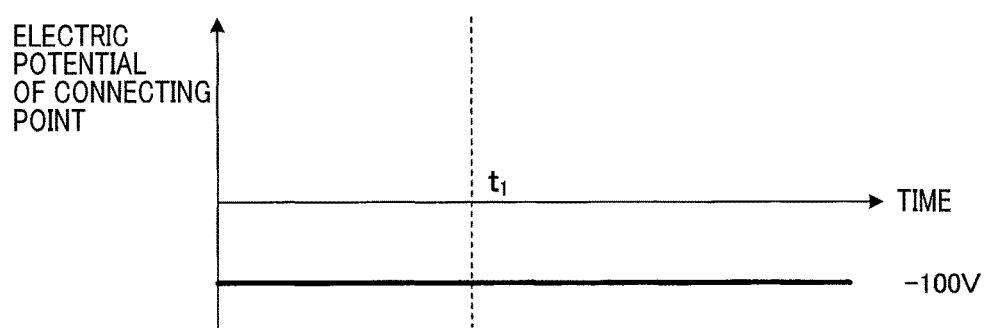
FIG. 7 is a graph showing a change in the electric potential of a connecting point in a case where a short-circuit fault has not occurred in any of the pair of switches, according to the first embodiment.
Figure 8:
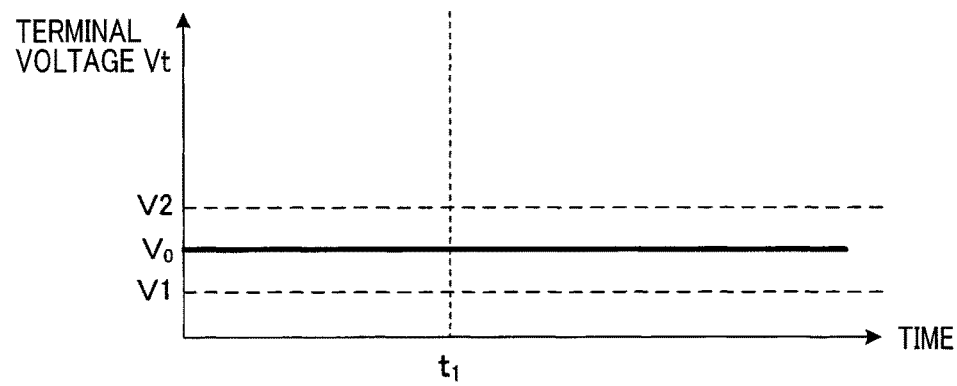
FIG. 8 is a graph showing a change in terminal voltage in a case where a short-circuit fault has not occurred in any of the pair of switches, according to the first embodiment.
Figure 9:
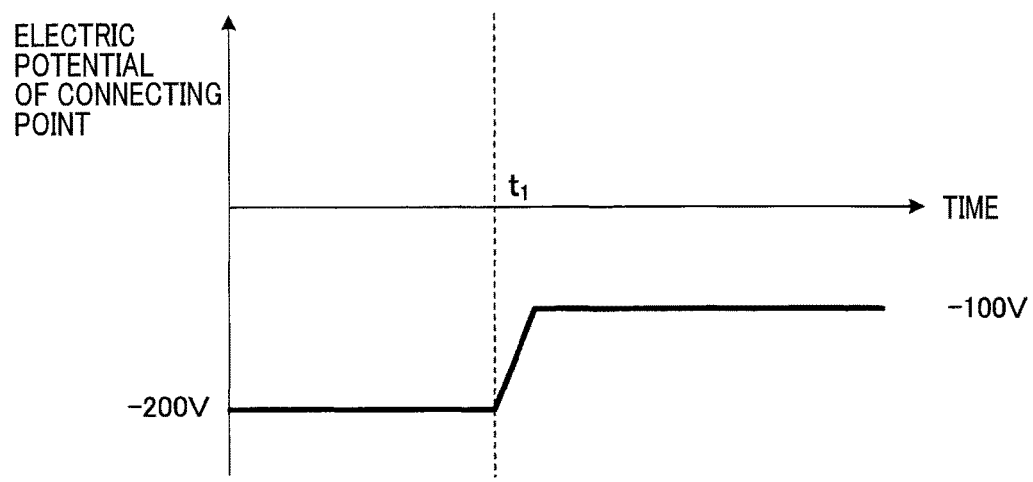
FIG. 9 is a graph showing a change in an electric potential of the connecting point in a case where a short-circuit fault has occurred in the positive-side switch, according to the first embodiment.

When a short-circuit fault has occurred in neither of the two switches 3, the connecting point A is insulated from the capacitor 4. Hence, even when the capacitor 4 is charged to change the electric potentials of the terminals 41 and 42, the connecting point A is not affected. For example, assuming that the voltage of the DC power supply 10 is 200 V, the voltage of the DC power supply 10 is divided by the two first resistors R1. Hence, the electric potential of the connecting point A becomes −100 V. When a short-circuit fault has occurred in neither of the two switches 3, the electric potential of the connecting point A does not change even when the capacitor 4 is charged. Hence, as shown in FIG. 7, the electric potential of the connecting point A is kept −100 V before and after the capacitor 4 is charged. Hence, as shown in FIG. 8, the terminal voltage Vt is kept the constant value Vo.

Figure 3:
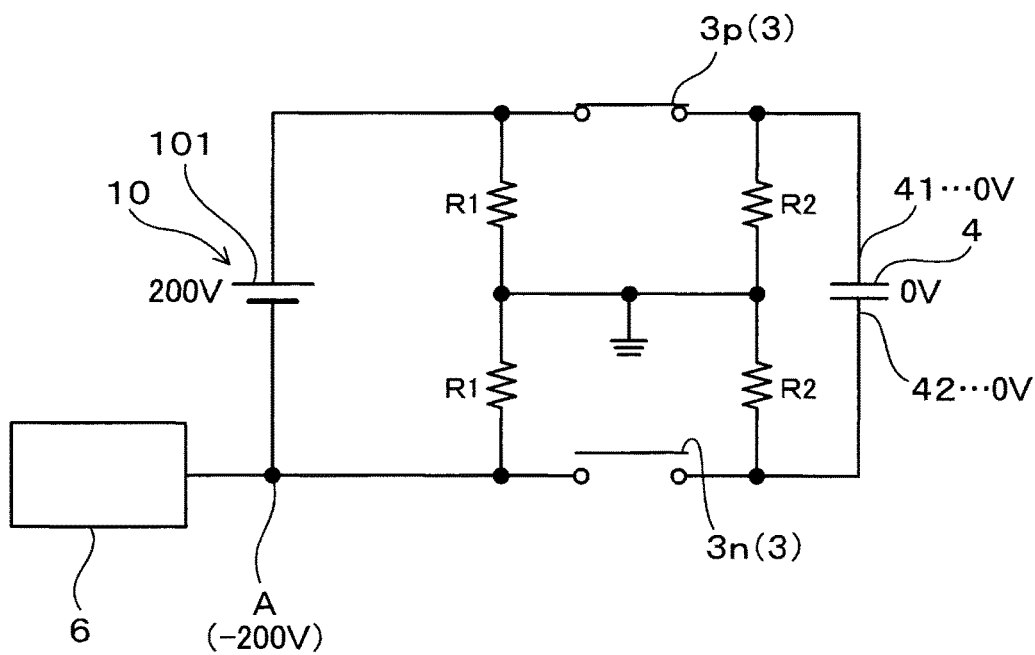
FIG. 3 is an equivalent circuit schematic of the fault detection system in which a short-circuit fault has occurred in a positive-side switch, and a capacitor is not charged, according to the first embodiment.

In addition, as shown in FIG. 3, if a short-circuit fault occurs in the positive side switch 3p, the electric potential of the positive terminal 41 of the capacitor 4 and that of the positive electrode 101 of the DC power supply 10 become the same. When the capacitor 4 has not been charged, the voltage between the terminals 41 and 42 of the capacitor 4 is 0 V. Hence, the electric potential of the positive terminal 41 of the capacitor 4 with respect to the ground becomes 0 V. Thereby, the electric potential of the positive electrode 101 of the DC power supply 10 also becomes 0 V. Since the electric potential of the connecting point A is lower than that of the DC power supply 10 by 200 V, the electric potential of the connecting point A is −200 V.

Figure 4:
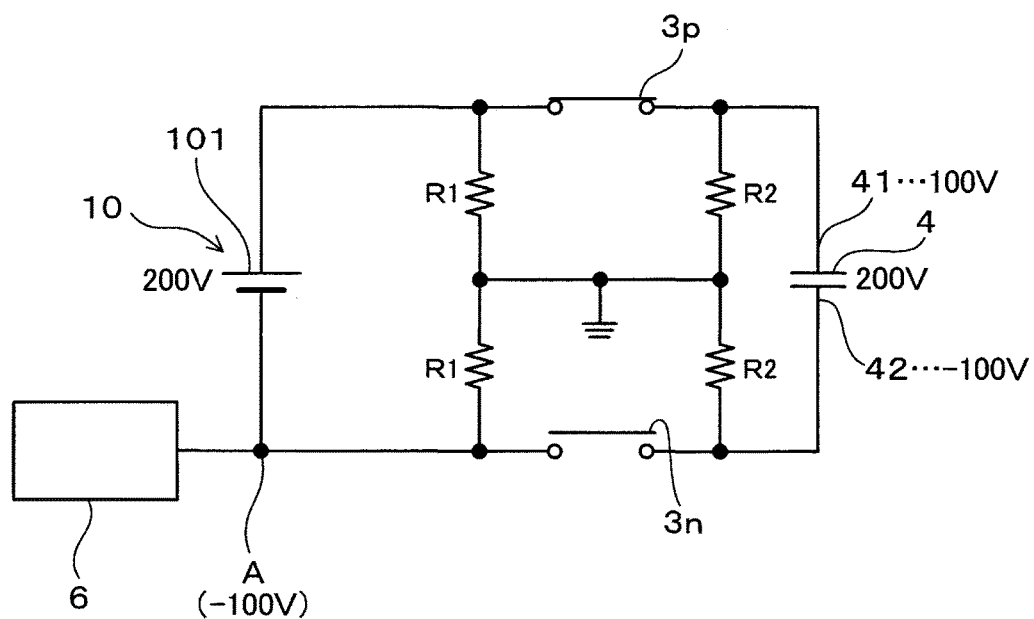
FIG. 4 is an equivalent circuit schematic of the fault detection system in which a short-circuit fault has occurred in the positive-side switch, and the capacitor is charged, according to the first embodiment.

Thereafter, as shown in FIG. 4, if the capacitor 4 is charged, the voltage between the terminals 41 and 42 of the capacitor 4 becomes 200 V. The voltage of the capacitor 4 is divided by the two second resistors R2. Hence, the electric potential of the positive terminal 41 with respect to the ground becomes 100 V. Thereby, the electric potential of the positive electrode 101 of the DC power supply 10 also becomes 100 V. Since the electric potential of the connecting point A is lower than that of the positive electrode 101 by 200 V, the electric potential of the connecting point A is −100 V.

As described above, as shown in FIG. 9, if a short-circuit fault occurs in the positive side switch 3p, when the capacitor 4 is charged, the electric potential of the connecting point A increases from −200 V to −100 V. This change in the electric potential can be detected by the detection section 6. That is, since the electric potential of the connecting point A increases at the moment when the capacitor 4 is charged, the detection capacitor 62 (refer to FIG. 1) is charged. Hence, as shown in FIG. 10, the terminal voltage Vt instantaneously decreases. If the terminal voltage Vt immediately after the capacitor 4 is charged falls below a predetermined lower limit V1, the determination section 7 determines that a short-circuit fault has occurred in the positive side switch 3p.

Figure 5:
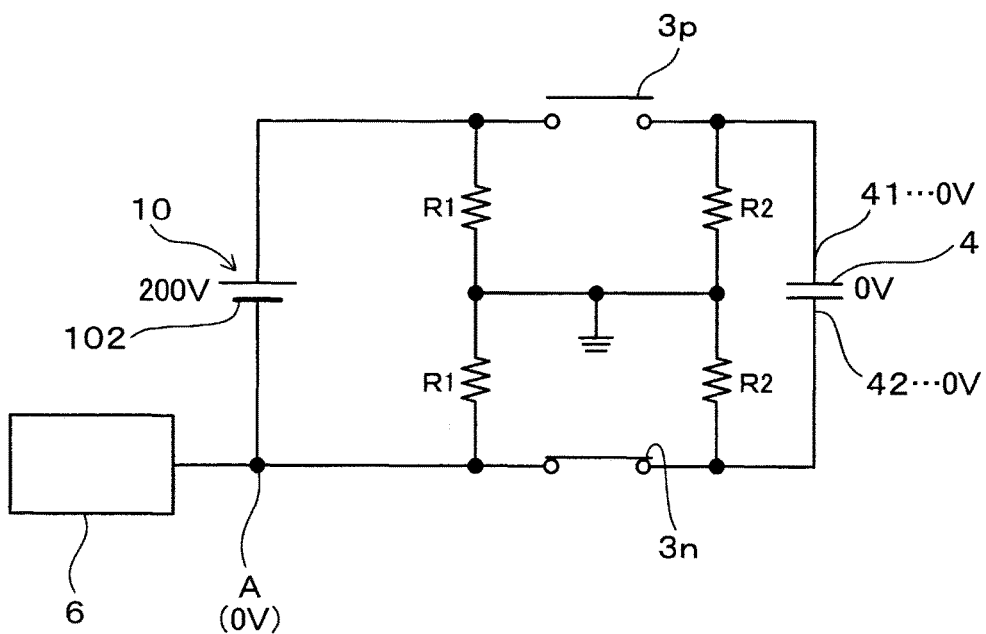
FIG. 5 is an equivalent circuit schematic of the fault detection system in which a short-circuit fault has occurred in a negative-side switch, and the capacitor is not charged, according to the first embodiment.

Next, a case is described where a short-circuit fault has occurred in the negative side switch 3n. As shown in FIG. 5, if a short-circuit fault occurs in the negative side switch 3n, the electric potential of the negative terminal 42 of the capacitor 4 and that of the connecting point A become the same. When the capacitor 4 is not charged, the voltage between the terminals 41 and 42 of the capacitor 4 becomes 0 V. Hence, the electric potential of the negative terminal 42 with respect to the ground become 0 V. Hence, the electric potential of the connecting point A also becomes 0 V.

Figure 6:
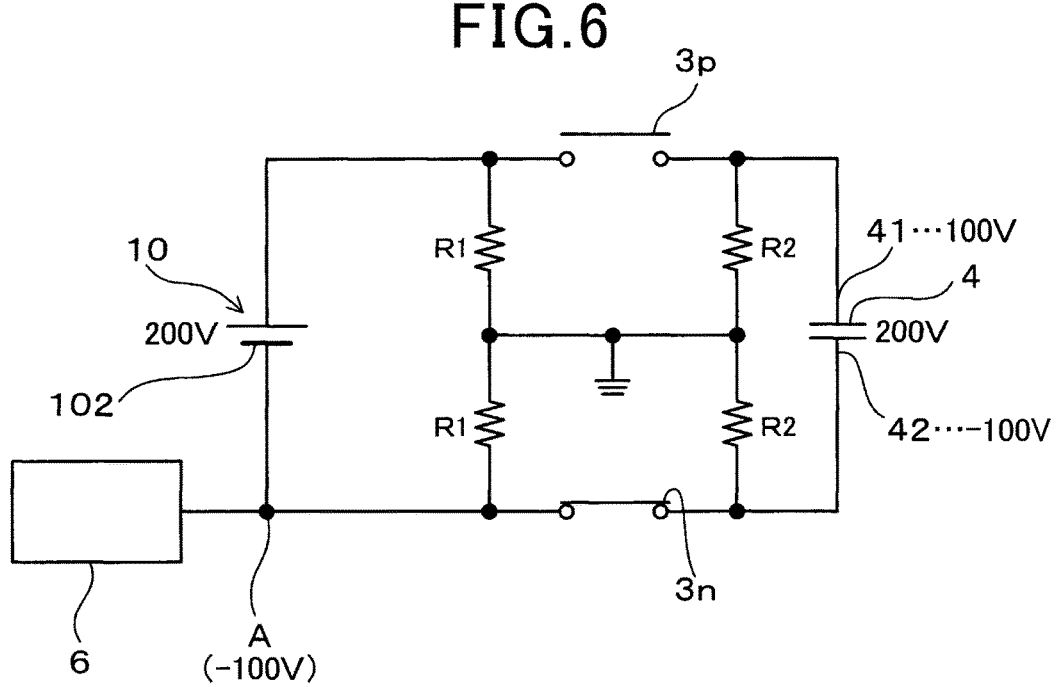
FIG. 6 is an equivalent circuit schematic of the fault detection system in which a short-circuit fault has occurred in the negative-side switch, and the capacitor is charged, according to the first embodiment.

As shown in FIG. 6, when the capacitor 4 is charged, the voltage between the terminals 41 and 42 of the capacitor 4 becomes 200 V. The voltage of the capacitor 4 is divided by the two second resistors R2. Hence, the electric potential of the negative terminal 42 of the capacitor 4 with respect to the ground become −100 V. Hence, the electric potential of the connecting point A also becomes −100 V.

As described above, as shown in FIG. 11, if a short-circuit fault occurs in the negative side switch 3n, when the capacitor 4 is charged, the electric potential of the connecting point A decreases from 0 V to −100 V. This change in the electric potential can be detected by the detection section 6. That is, since the electric potential of the connecting point A decreases at the moment when the capacitor 4 is charged, charge is released from the detection capacitor 62 (refer to FIG. 1). Hence, as shown in FIG. 12, the terminal voltage Vt instantaneously increases. If the terminal voltage Vt immediately after the capacitor 4 is charged exceeds a predetermined upper limit V2, the determination section 7 determines that a short-circuit fault has occurred in the negative side switch 3n.

Figure 13:
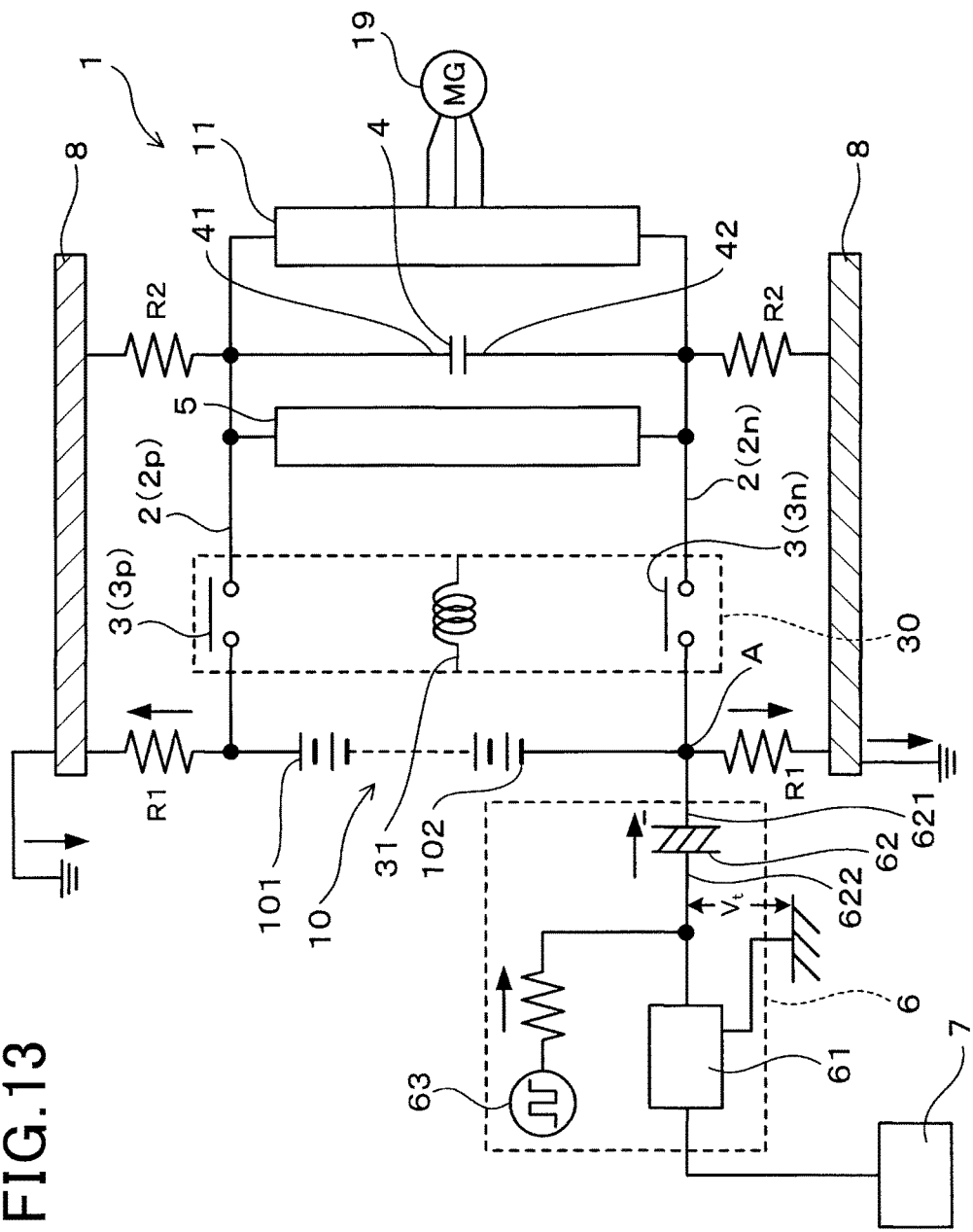
FIG. 13 is a circuit diagram of the fault detection system in which presence or absence of an electric leakage is detected, according to the first embodiment.
Figure 14:
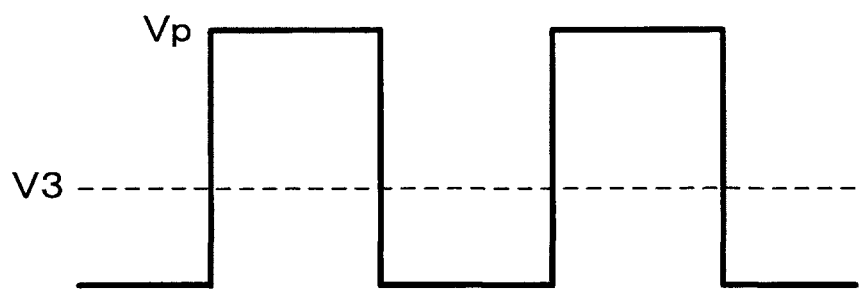
FIG. 14 is a waveform of an AC signal detected by a main detection section in a case where an electric leakage has not occurred, according to the first embodiment.

In addition, the present embodiment has a configuration for determining presence or absence of an electric leakage from the DC power supply 10 by using the detection section 6 and the determination section 7. As shown in FIG. 13, when occurrence of an electric leakage is checked, the signal generation unit 63 generates an AC signal. The peak voltage Vp (refer to FIG. 14) of the AC signal is measured by the detection main unit 61. When an electric leakage has not occurred from the DC power supply 10, the AC signal does not pass through the first resistor R1 and does not flow to the ground. Hence, as shown in FIG. 14, the peak voltage Vp measured by the detection main unit 61 becomes a relatively high value. If the peak voltage Vp is higher than a predetermined threshold value V3, the determination section 7 determines that an electric leakage has occurred from the DC power supply 10.

Figure 15:
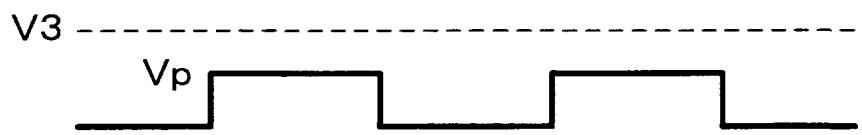
FIG. 15 is a waveform of an AC signal detected by the main detection section in a case where an electric leakage has occurred, according to the first embodiment.

When an electric leakage has occurred from the DC power supply 10, the AC signal passes through the detection capacitor 62, and flows through the first resistor R1 to the ground. Hence, as shown in FIG. 15, the peak voltage Vp measured by the detection main unit 61 lowers. If the peak voltage Vp is lower than the predetermined threshold value V3, the determination section 7 determines that an electric leakage has occurred from the DC power supply 10.

Figure 16:
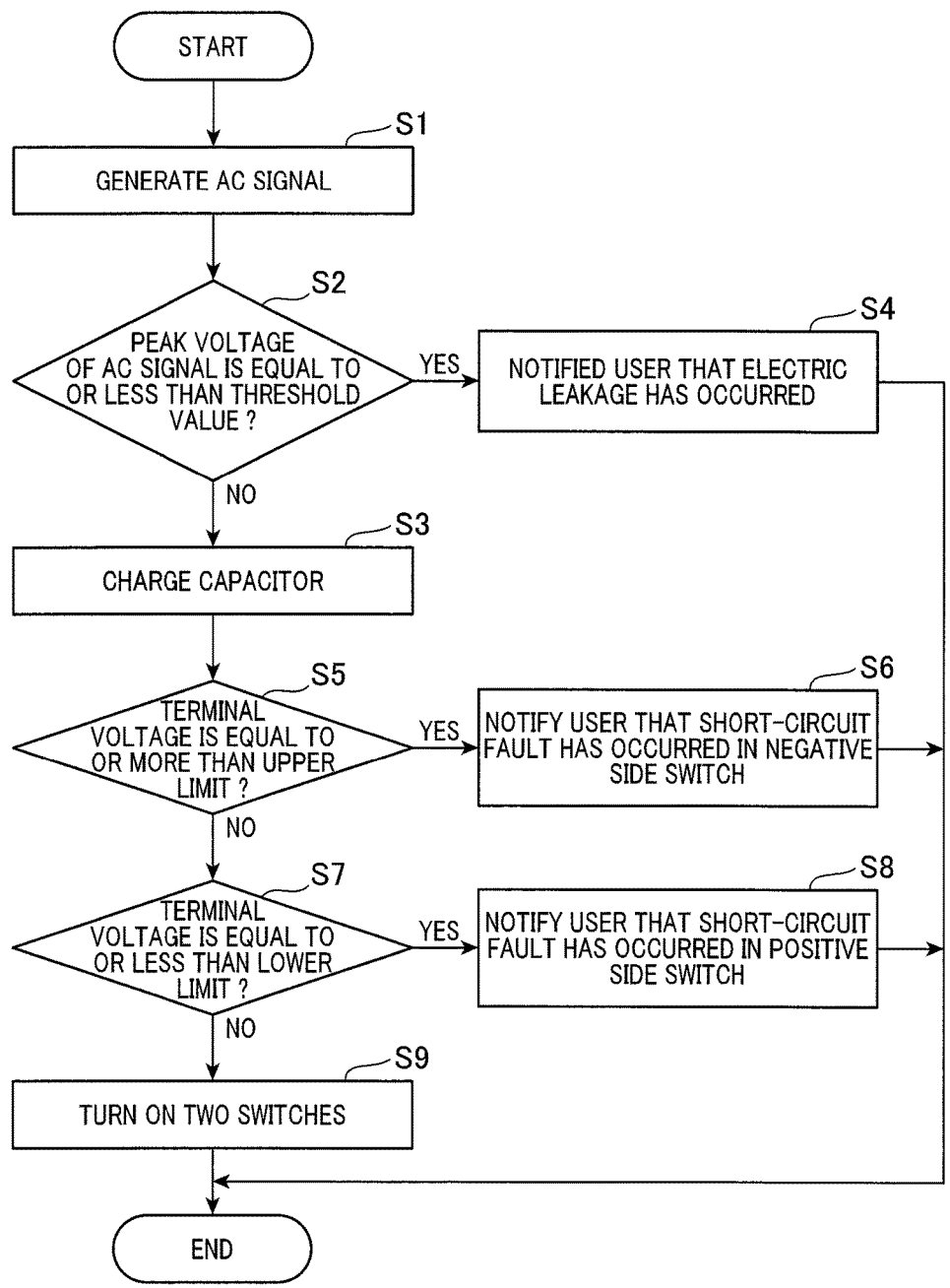
FIG. 16 is a flowchart of a process performed by the fault detection system according to the first embodiment.

Next, a flowchart of the present embodiment is described. As shown in FIG. 16, first, the signal generation unit 63 generates an AC signal in step S1. Then, the process proceeds to step S2, in which the determination section 7 determines whether or not the peak voltage Vp of the AC signal is equal to or less than the threshold value V3 (refer to FIG. 15). If the determination result is Yes, the process proceeds to step S4, in which the determination section 7 notifies the user of the electric leakage from the DC power supply 10. In contrast, if the determination result is No in step S2, the process proceeds to step S3, in which the capacitor 4 is charged by using the charging unit 5.

Thereafter, the process proceeds to step S5, in which the determination section 7 determines whether or not the terminal voltage Vt is equal to or more than the upper limit V2 (refer to FIG. 12). If the determination result is Yes, the process proceeds to step S6, in which the determination section 7 notifies the user that a short-circuit fault has occurred in the negative side switch 3n. In contrast, If the determination result is No, the process proceeds to step S7, in which the determination section 7 determines whether or not the terminal voltage Vt is equal to or lower than the lower limit V1 (refer to FIG. 10). If the determination result is Yes, the process proceeds to step S8, in which the determination section 7 notifies the user that a short-circuit fault has occurred in the positive side switch 3p. In contrast, If the determination result is No in step S7, the process proceeds to step S9, in which the two switches 3p and 3n are turned on.

Advantages of the present embodiment are described. The fault detection system 1 includes the charging unit 5, the detection section 6, and the determination section 7.

Hence, even when the pair of the switches 3p and 3n cannot individually operate, it can be determined whether or not a short-circuit fault has occurred in the switches 3p and 3n. The switches 3p and 3n are provided between the connecting point A and the capacitor 4. Hence, if a short-circuit fault occurs in the switches 3, the terminals 41 and 42 of the capacitor 4 and the connecting point A are electrically connected, whereby the electric potential of the connecting point A changes with the change in the voltage of the capacitor 4. That is, when a short-circuit fault occurs in the switches 3, the electric potential of the connecting point A greatly differs between before and after the capacitor 4 is charged. Hence, without turning on and off the switches 3, detecting the change in the electric potential can determine whether a short-circuit fault has occurred in the switches 3.

In addition, the detection section 6 has the detection main unit 61 and the detection capacitor 62. The detection capacitor 62 is provided between the detection main unit 61 and the connecting point A.

Hence, the detection capacitor 62 can insulate the DC power supply 10 and the detection main unit 61 from each other. Hence, high voltage can be prevented from being applied from the DC power supply 10 to the detection main unit 61. Thereby, a fault can be prevented from occurring in the detection main unit 61.

In addition, providing the detection capacitor 62 can store charge in the detection capacitor 62 when electric potential of the connecting point A is changed. Thereby, the terminal voltage Vt greatly changes. Hence, measuring the terminal voltage Vt to determine whether the measurement value has not been within the predetermined range (V1 to V2) can determine whether or not a short-circuit fault has occurred in the switches 3.

In addition, the determination section 7 determines whether the terminal voltage Vt has increased or decreased immediately after the capacitor 4 is charged. Thereby, it is determined whether it is the switch 3p or the switch 3n in which a short-circuit fault has occurred. That is, if the terminal voltage Vt increases to equal to or more than the upper limit V2, the determination section 7 determines that a short-circuit fault has occurred in the negative side switch 3n. If the terminal voltage Vt decreases to equal to or less than the lower limit V1, the determination section 7 determines that a short-circuit fault has occurred in the positive side switch 3p.

Hence, the determination section 7 can notify the user of one of the switches 3p and 3n in which a short-circuit fault has occurred.

In addition, in the present embodiment, an electrolytic capacitor is used as the detection capacitor 62. Since the electrolytic capacitor has larger capacitance, when the electric potential of the connecting point A has changed, a large amount of charge can be stored in the electrolytic capacitor (detection capacitor 62). Hence, as shown in FIG. 10, when the electric potential of the connecting point A has changed, and the terminal voltage Vt has changed, the terminal voltage Vt does not return to the original value Vo in a short time. Hence, the determination whether or not the terminal voltage Vt has not been within the predetermined range (V1 to V2) can be easily made.

In addition, if an electrolytic capacitor having larger capacitance is used as the detection capacitor 62, when occurrence of an electric leakage from the DC power supply 10 is checked, an AC signal generated from the signal generation unit 63 easily passes through the detection capacitor 62. Hence, occurrence of an electric leakage can be easily checked.

In addition, the detection section 6 includes the signal generation unit 63. When occurrence of an electric leakage is checked, the signal generation unit 63 generates an AC signal. If the peak voltage Vp (refer to FIG. 15) of the AC signal detected by the detection main unit 61 is equal to or less than the predetermined V3, the determination section 7 determines that an electric leakage has occurred from the DC power supply 10.

Hence, occurrence of an electric leakage from the DC power supply 10 can be checked by using the determination section 7 provided for checking for an short-circuit fault of the switches 3, and the detection main unit 61.

As described above, according to the present embodiment, a fault detection system can be provided which can check for a short-circuit fault of a pair of switches even when the switches cannot individually operate.

Second Embodiment

Figure 18:
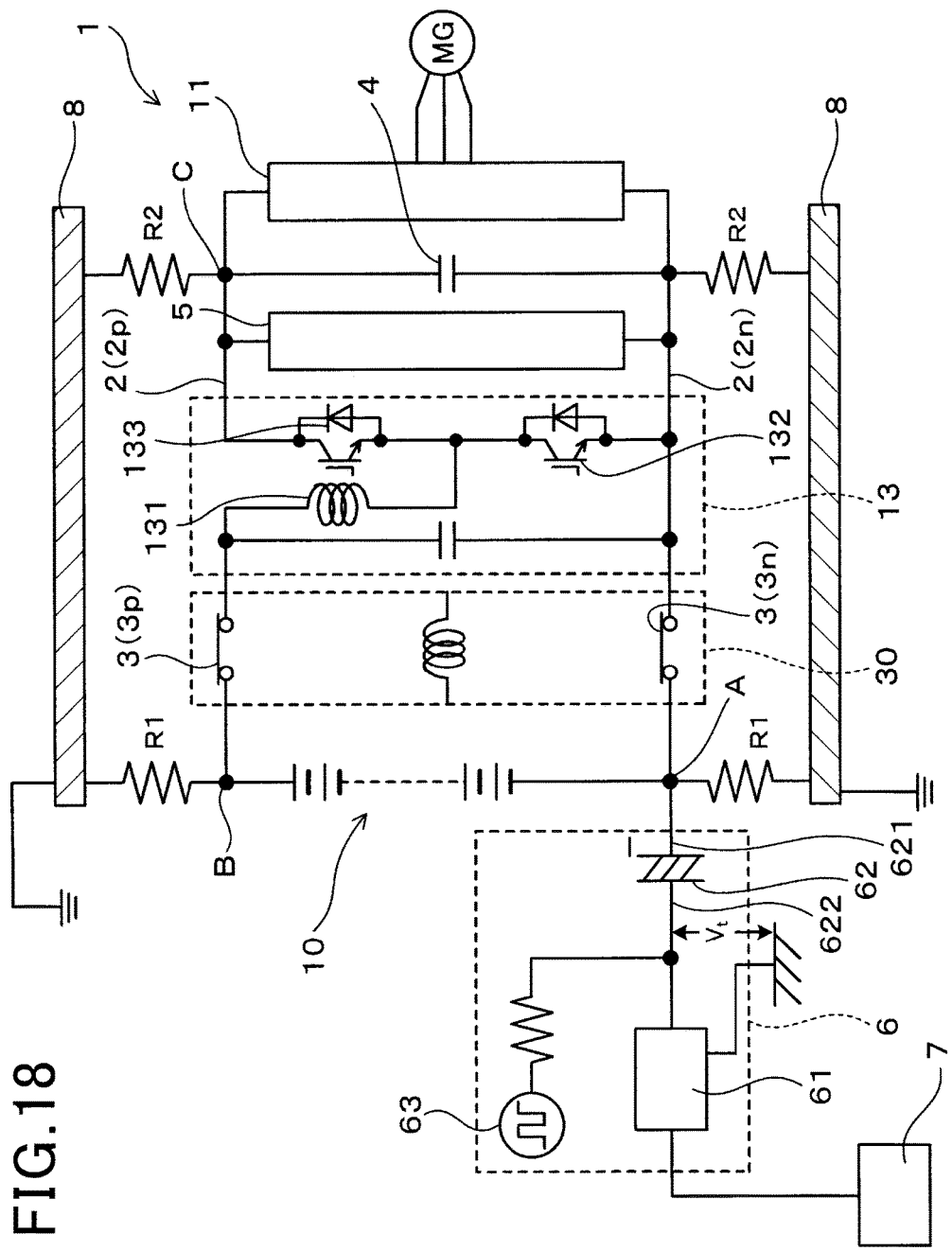
FIG. 18 is a circuit diagram of a fault detection system according to a second embodiment.

The present embodiment exemplifies a modification of the circuit configuration of the fault detection system 1. As shown in FIG. 18, in the present embodiment, a step-up circuit 13 is provided between the switches and the capacitor 4. This step-up circuit 13 is used to increase the voltage of the DC power supply 10 to apply voltage to the capacitor 4 and the electric equipment 11.

The step-up circuit 13 includes a reactor 131, switching elements 132, and diodes 133. The switching elements 132 are made to perform switching operation to increase the voltage of the DC power supply 10 by using the reactor 131.

Figure 21:
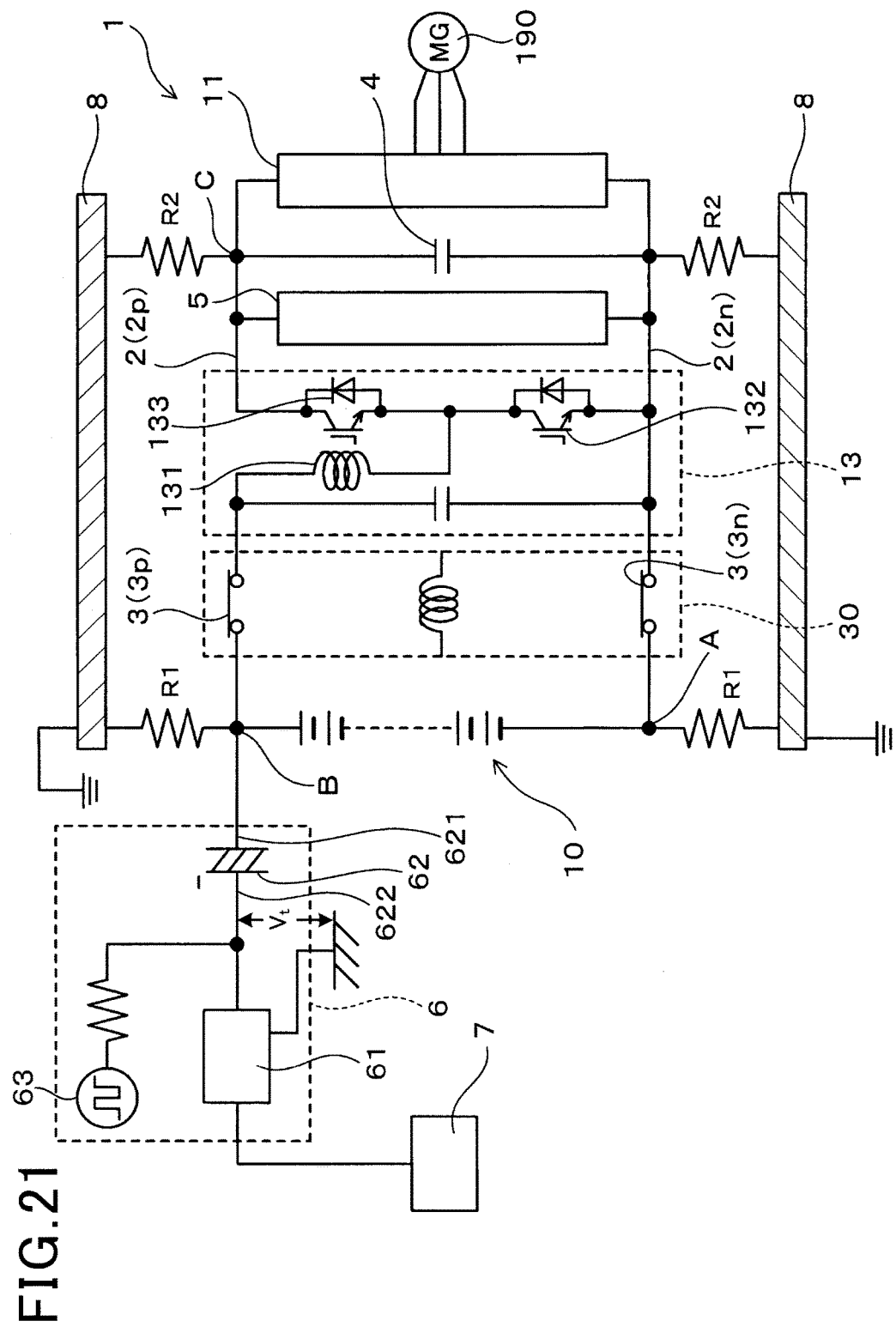
FIG. 21 is a circuit diagram of a fault detection system according to a reference example.

As in the case of the present embodiment, when the step-up circuit 13 is provided, and an electrolytic capacitor is used as the detection capacitor 62, as shown in FIG. 18, the detection section 6 is preferably connected to the negative side electric power line 2n. That is, as shown in FIG. 21, if the detection section 6 is connected to the positive side electric power line 2p, a voltage may be applied to the detection capacitor 62 in the opposite direction. Hence, the detection capacitor 62 (electrolytic capacitor) may deteriorate. The electric potential of the terminal 622 is close to that of the ground, and the electric potential of a connecting point B is typically higher than that of the ground. Hence, as shown in FIG. 21, the detection capacitor 62 (electrolytic capacitor) is connected in a state where the terminal 622 is the negative terminal. In the state shown in FIG. 21, a case is considered where the voltage of the DC power supply 10 is, for example, 200 V, and, the voltage higher than this, for example, 600 V is applied to the DC power supply 10 when power is regenerated. When power is not regenerated, the electric potential of the connecting point B becomes 100 V, and the electric potential of the connecting point A becomes −100 V. Hence, a voltage is applied to the detection capacitor 62 in the normal direction. However, when power is regenerated, an electric leakage may occur between the connecting point C and the conductive member 8. In this case, the electric potential of the connecting point C becomes substantially 0. In addition, since a generator 190 generates the voltage of 600 V, the electric potential of the connecting point A becomes lower than that of the connecting point C by 600 V, that is, −600V. The electric potential of the connecting point B is higher than that of the connecting point C by 200 V, that is, −400V. In this case, a voltage is applied to the detection capacitor 62 in the opposite direction. Hence, the detection capacitor 62 (electrolytic capacitor) may deteriorate.

In contrast, as shown in FIG. 18, connecting the detection section 6 to the negative side electric power line 2n can prevent the above problem. The electric potential of the terminal 622 is close to that of the ground, and the electric potential of the terminal 621 is lower than that of the ground. Hence, the detection capacitor 62 is connected in a state where the terminal 621 is the negative terminal. When power is not regenerated, as described above, the electric potential of the connecting point A is −100 V. Hence, a voltage is applied to the detection capacitor 62 in the normal direction. When power is regenerated, if an electric leakage has occurred from the connecting point C, and the electric potential becomes 0 V, the electric potential of the connecting point A becomes −600 V. Hence, even in this case, a voltage is applied to the detection capacitor 62 in the normal direction. Accordingly, the voltage is not applied to the detection capacitor 62 in the opposite direction, whereby the detection capacitor 62 can be prevented from deteriorating.

In addition, the present embodiment includes the configuration and advantages similar to those of the first embodiment.

Third Embodiment

Figure 19:
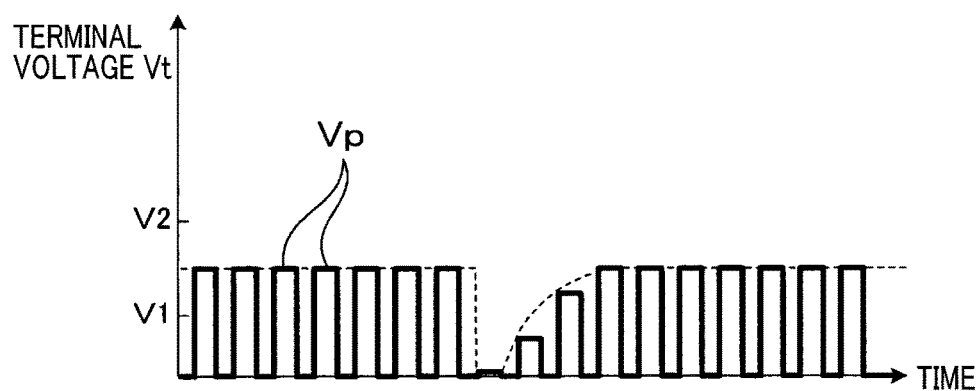
FIG. 19 is a graph showing a change in the terminal voltage in a case where a short-circuit fault has occurred in the positive-side switch, according to a third embodiment.
Figure 20:
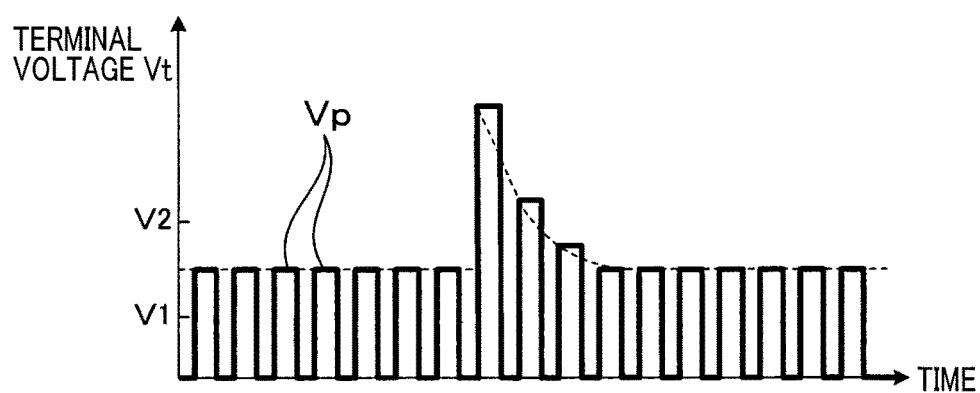
FIG. 20 is a graph showing a change in the terminal voltage in a case where a short-circuit fault has occurred in the negative-side switch, according to the third embodiment.

The present embodiment exemplifies modifications of a signal generated from the signal generation unit 63 when occurrence of a short-circuit fault in the switches is checked. In the present embodiment, when occurrence of a short-circuit fault is checked, the signal generation unit 63 generates an AC signal having the same frequency as that of a signal generated when occurrence of an electric leakage is checked. Hence, for example, when a short-circuit fault has occurred in the positive side switch 3p, the terminal voltage Vt shows a waveform shown in FIG. 19. When a short-circuit fault has occurred in the negative side switch 3, the terminal voltage Vt shows a waveform shown in FIG. 20. The detection main unit 61 of the present embodiment measures the peak voltage Vp of the AC signal as the terminal voltage Vt.

Advantages of the present embodiment are described. According to the above configuration, by using the voltage measurement circuit formed in the detection main unit 61, the peak voltage Vp of the AC signal can be measured when occurrence of an electric leakage is checked, and the terminal voltage Vt can be measured when occurrence of a short-circuit fault is checked. Hence, the circuit configuration of the detection main unit 61 can be simplified.

In addition, the present embodiment includes the configuration and advantages similar to those of the first embodiment.

It will be appreciated that the present invention is not limited to the configurations described above, but any and all modifications, variations or equivalents, which may occur to those who are skilled in the art, should be considered to fall within the scope of the present invention.

Hereinafter, aspects of the above-described embodiments will be summarized.

As an aspect of the embodiment, a fault detection system (1) is provided which includes: a pair of electric power lines (2) that connects between a DC power supply (10) and electric equipment (11); a pair of switches (3) that is respectively provided to the pair of electric power lines (2); a capacitor (4) that is connected to the pair of electric power lines (2) at a position where a distance to the electric equipment (11) is shorter than a distance between the switches (3) and the electric equipment (11); a charging unit (5) that charges the capacitor (4) before the switches (3) are turned on; a detection section (6) that is connected to the electric power line (2) at a connecting point (A) where a distance to the DC power supply (10) is shorter than a distance between the switches (3) and the DC power supply (10), and detects a change in an electric potential of the connecting point (A); and a determination section (7) that determines whether or not a short-circuit fault has occurred in any one of the pair of switches (3) based on a difference in the electric potential of the connecting point (A) between before and after the capacitor (4) is charged by the charging unit (5).

In the fault detection system, the charging unit charges the capacitor before the switches are turned on. In addition, the detection section is connected to the electric power line at the connecting point where the distance to the DC power supply is shorter than the distance between the switches and the DC power supply, and detects a change in the electric potential of the connecting point. Furthermore, the determination section determines whether or not a short-circuit fault has occurred in any one of the pair of switches based on the difference in the electric potential of the connecting point between before and after the capacitor is charged.

According to the above configuration, even when the pair of switches cannot individually operate, it can be determined whether or not a short-circuit fault has occurred in the switches. The switches are provided between the connecting point and the capacitor. Hence, if a short-circuit fault occurs in the switches, the terminals of the capacitor and the connecting point are electrically connected, whereby the electric potential of the connecting point changes with the change in the voltage of the capacitor. That is, when a short-circuit fault occurs in the switches, the electric potential of the connecting point greatly differs between before and after the capacitor is charged. Hence, without turning on and off the switches, detecting the change in the electric potential can determine whether a short-circuit fault has occurred in the switches.

As described above, according to the embodiment, a fault detection system can be provided which can check for occurrence of a short-circuit fault of a pair of switches even when the switches cannot individually operate.

Note that the short-circuit fault is a fault in which, although the switch is controlled so as to be turned off, the switch is not turned off and remains turned on. For example, when the switch is stuck by melting, or a spring member or a drive circuit in the relay has failed, even when the switch is controlled so as to be turned off, the switch may remain turned on. This corresponds to the short-circuit fault.

What is claimed is:

1. A fault detection system, comprising:
a pair of electric power lines that connects between a DC power supply and electric equipment;
a pair of switches that is respectively provided to the pair of electric power lines;
a capacitor that is connected to the pair of electric power lines at a position where a distance to the electric equipment is shorter than a distance between the switches and the electric equipment;
a charging unit that charges the capacitor before the switches are turned on;
a detection section that is connected to the electric power line at a connecting point between the detection section and the DC power supply, where a distance to the DC power supply is shorter than a distance between the switches and the DC power supply, and detects a change in an electric potential of the connecting point; and
a determination section that determines whether or not a short-circuit fault has occurred in any one of the pair of switches based on a difference in the electric potential of the connecting point, the difference being a change in the electric potential at the connecting point provided between the detection section and the DC power supply before and after the capacitor is charged by the charging unit.

2. The fault detection system according to claim 1, wherein
the detection section has a detection main unit and a detection capacitor provided between the detection main unit and the connecting point,
the detection main unit measures a terminal voltage, which is a potential difference between the ground and a terminal of the detection capacitor positioned at an opposite side of the terminal of the detection capacitor connected to the connecting point, and
the determination section determines that a short-circuit fault has occurred in the switches if the terminal voltage immediately after the capacitor is charged has not been within a predetermined range.

3. The fault detection system according to claim 2, wherein
the determination section determines whether the terminal voltage has increased or decreased immediately after the capacitor is charged, to determine which one of the pair of switches has a short-circuit fault.

4. The fault detection system according to claim 2, wherein
the detection section is connected between the detection capacitor and the detection main unit, and includes a signal generation unit that generates an AC signal, and
if a peak value of the AC signal detected by the detection main unit is equal to or less than a predetermined threshold value, the determination section determines that an electric leakage has occurred from the DC power supply.

5. The fault detection system according to claim 4, wherein
the signal generation unit generates the AC signal when it is checked whether or not a short-circuit fault has occurred in the switches, and
the detection main unit detects the peak value of the AC signal as the terminal voltage.

* * * * *